United States Patent
Hong et al.

(10) Patent No.: US 6,957,442 B2
(45) Date of Patent: Oct. 18, 2005

(54) SPINDLE MOTOR FOR OPTICAL DISC PLAYER

(75) Inventors: Weon Ki Hong, Suwon-Shi (KR); Tae Heon Kim, Yongin-Shi (KR)

(73) Assignee: Samsung Electro-Mechanics Co., Ltd., Kyungki-Do (KR)

(*) Notice: Subject to any disclaimer, the term of this patent is extended or adjusted under 35 U.S.C. 154(b) by 35 days.

(21) Appl. No.: 10/414,944

(22) Filed: Apr. 16, 2003

(65) Prior Publication Data

US 2004/0052201 A1 Mar. 18, 2004

(30) Foreign Application Priority Data

Sep. 12, 2002 (KR) .............................. 10-2002-0055486

(51) Int. Cl.[7] .......................................... G11B 19/20
(52) U.S. Cl. ...................................... 720/702
(58) Field of Search ............................... 720/702, 701; 360/98.08; 369/263; 310/67 R, 51; 74/573 R

(56) References Cited

U.S. PATENT DOCUMENTS

| 6,295,269 | B1 | * | 9/2001 | Takeuchi et al. ............. 720/701 |
| 6,452,896 | B1 | * | 9/2002 | Song ........................... 720/702 |
| 6,455,961 | B1 | * | 9/2002 | Higuchi ..................... 310/67 R |
| 6,741,544 | B1 | * | 5/2004 | Naka et al. .................. 720/702 |
| 6,771,460 | B2 | * | 8/2004 | Tsuyuki et al. .......... 360/99.08 |
| 2001/0000312 | A1 | * | 4/2001 | Kume et al. ................ 369/263 |

* cited by examiner

Primary Examiner—Tianjie Chen
(74) Attorney, Agent, or Firm—Darby & Darby

(57) ABSTRACT

A spindle motor in an optical disc player includes a motor having a rotation shaft, a turntable rotating together with the rotation shaft and having a track groove having a circular shape, moving members disposed in the track groove to move along the track groove to compensate for an eccentric force, a collision and dispersion inducing unit having a height from the track groove to induce a rebounding phenomenon between the moving members to be spaced-apart from each other when the moving members are arranged in a non-uniform displacement due to a centrifugal force and a friction between the track groove and the moving members.

17 Claims, 6 Drawing Sheets

SPINDLE MOTOR FOR OPTICAL DISC PLAYER

CROSS-REFERENCE TO RELATED APPLICATION

This application claims the benefit of Korean Patent Application No. 2002-55486, filed Sep. 12, 2002, in the Korean Intellectual Property Office, the disclosure of which is incorporated herein by reference.

BACKGROUND OF THE INVENTION

1. Field of the Invention

The present invention relates to a spindle motor of an optical disc player having a self-compensating dynamic balancing apparatus, and more particularly, to an optical disc player having a self-compensating dynamic balancing apparatus capable of compensating for eccentricity of a spindle motor and a turntable to stabilize the spindle motor and the turntable by controlling moving members disposed on a track groove of the turntable to be spaced-apart from each other by a predetermined distance in an initial rotating stage of the spindle motor.

2. Description of the Related Art

Generally, an optical disc player has been widely used due to a high recording density of an optical disc and an advantage of storing data semi-permanently compared with a magnetic tape or other recording media.

The optical disc player includes a laser disc player, a compact disc player, and a digital versatile disc player. Although the compact disc player has been a popular disc player due to a portability and a small-sized volume, the digital versatile disc player is more popular and used than the compact disc player due to a high recording density in the same size as a compact disc.

In the optical disc player, the spindle motor needs to rotate the disc in a high speed without vibration or an eccentric movement of the disc and a turntable. It is very important to stabilize the turntable loaded with the disc to maintain the disc balanced during rotating in the high speed as well as to provide the spindle motor with durability in order to rotate the spindle motor without the vibration and the eccentric movement.

FIG. 1 is a cross-sectional view of a conventional spindle motor of an optical disc player the spindle motor of the optical disc player includes a motor 100 generating a rotation power, a rotating shaft 150 coupled to the motor 100, and a turntable 200 supported by the rotation shaft 150 and loaded with an optical disc D.

The motor 100 includes a plate 110, a burring unit 110' having a first cylindrical wall protruding upward from the plate, and a holder 120 having a second cylindrical wall with an opening and fitted into a bottom of the first cylindrical wall of the burring unit 110' through the opening of the burring unit 110'. A metal bearing 130 is forcibly inserted in a space formed between the rotation shaft 150 and the burring unit 110' and the holder 120. A core 140 having a coil winding around the core 140, to which an external electric power is selectively transmitted, is fixedly attached to an outside circumferential surface of the burring unit 110'. The rotation shaft 150 is rotatably disposed in an central hole of the bearing 130 and supported by the bearing 130 and the plate 110. A thrust washer 160 is coupled to a lower outside end of the rotation shaft 150.

A rotor 170 is coupled to an upper end of the rotation shaft 150 to form an integrated single body with the rotating shaft 150. The rotor has a cap with a cylindrical extension and an opening formed by the cylindrical extension. A cylindrical magnet 180 is coupled to an inside surface of the cylindrical extension of the rotor 170 and spaced apart from the coil of the core 140 to form an air gap with an outside surface of the coil of the core 140.

The rotor 170 having the magnet 180 rotates by an electromagnetic force generated between the coil of the core 140 and the magnet 180 of the rotor 170. The rotation shaft 150 coupled to the rotor 170 and supported by the bearing 130 rotates in response to a rotation of the motor 100.

The turntable 200 rotates together with the rotation shaft 150 of the motor 100 and includes a central protrusion to be inserted into a hole of the optical disc D when the optical disc D is loaded on the turntable 200 and a peripheral portion formed around the central protrusion, extended toward an outside of the central protrusion, and having a flat surface contacting a side of the optical disc D when the optical disc D is loaded on the turntable 200 and clamped by a clamping unit 250.

The turntable 200 includes a main body 210 and a cover plate 220. The main body 210 includes a bottom side of the turntable 200 and a track groove 230 formed on the bottom side of the turntable 200 around the rotation shaft 150 in a circular shape. The track groove 230 includes inner and outer circular guides extended downward from the bottom side of the turntable 200 and spaced apart from each other by a distance to form an opening. A plurality of balls 240 are movably and rotatably disposed within the track groove 230 and between the inner and outer circular guides. The cover plate 220 is coupled to the inner and outer circular guides to cover the opening of the track groove 230 while the balls are disposed in the track groove 230. The balls are disposed on the cover plate 220 and spaced apart from the bottom side of the turntable 200 by a predetermined height.

When the turntable 200 rotate together with the optical disc D in the high speed after the optical disc D is loaded and clamped on the turntable 200, the balls moves along the track groove 230 at a compensating position on the track groove 230 of the turntable 200 opposite to an eccentric position of an eccentric force in the turntable 200 with respect to a center of the rotation shaft 150. The movement of the balls to the compensating position compensates for eccentricity of the turntable 200 by generating a counter-centrifugal force and a bounding force. Thus, the vibration and the eccentric movement of the turntable 200 are prevented Since the balls 240, which are rotatably disposed in the track groove 230 move toward the compensating position within an initial rotation stage (period) before an initial speed of the turntable 200 and the motor 100 is changed to a normal (high) speed of the motor 100, the counter-centrifugal force is generated in response to the eccentric force of the turntable 200.

The eccentric force of the turntable 200 must be compensated within the initial rotation period before the motor rotates in the normal high speed in the optical disc player. However, the balls 240 are irregularly or non-uniformly arranged in the track groove 230 when the motor and the turntable do not rotate but are in a stationary state. In this state, the balls 240 cannot move to the compensating position from an irregular position when the motor 100 rotates, and the eccentricity of the turntable 200 cannot be compensated.

That is, the balls 240 disposed in the track groove 230 of the turntable 200 of the spindle motor in the optical disc player are not arranged regularly and uniformly in a predetermined distance and a predetermined position but irregularly and non-uniformly arranged due to friction between the balls 240 or between the track groove 230 and the balls 240 as shown in FIG. 2. If the motor 100 rotates, the balls 240, which are disposed irregularly in the track groove 230, rotates along the track groove 230 by the centrifugal force and the friction occurring due to a rotational force of the motor 100. Thus, the balls 240 do not move to a counter-centrifugal force position p1 for compensating for an actual eccentric mass me1 but move to an incorrect counter-centrifugal force position p2 to compensate for the incorrect eccentric force me2. If the incorrect counter-centrifugal force is generated in the incorrect counter-centrifugal force position p2, the incorrect counter-centrifugal force is compensated but the actual eccentric force cannot be compensated. As a result, the vibration and noise are generated from the motor 100 and the turntable 200, and a driving characteristic of the motor 100 is lowered.

SUMMARY OF THE INVENTION

It is an object of the present invention to provide an optical disc player having a spindle motor and a turntable having a self compensating dynamic balancer capable of accurately compensating for eccentricity of the turntable within an initial period of the spindle motor before the spindle motor rotates in a normal speed, by precisely moving balls to an eccentric force compensating position.

Additional objects and advantageous of the invention will be set forth in part in the description which follows and, in part, will be obvious from the description, or may be learned by practice of the invention.

To achieve the above and other objects, there is provided a spindle motor in an optical disc player according to an embodiment of the present invention. The spindle motor includes a motor having a rotation shaft, a turntable rotating together with the rotation shaft and having a track groove having a circular shape, moving members disposed in the track groove to move along the track groove to compensate for an eccentric force, a collision and dispersion inducing unit having a height from the track groove to induce a rebounding phenomenon between the moving members to be spaced-apart from each other when the moving members are arranged in a non-uniform displacement due to a centrifugal force and a friction between the track groove and the moving members.

According to an aspect of the present invention, the spindle motor includes a burring unit including a cylinder with a lower opening, a plate including a holder having a second cylinder with an upper opening and inserted into the burring unit through the opening of the burring unit, having a hole into which the rotation shaft is forcibly inserted, a bearing disposed between the rotation shaft and the cylinder of the burring unit, a core disposed around an outer surface of the burring unit and including a coil attached on the outer surface of the burring unit, and a rotor disposed on a bottom surface of the turntable and formed in an integrated body with the rotation shaft, including a cap having a peripheral circular extension extended downward, including a magnet disposed on a surface of the peripheral circular extension to face the coil of the core and to be spaced apart from the coil of the core by an air gap.

According to another aspect of the present invention, the spindle motor includes a main body of the turntable, a cylindrical circular guides extended from the main body and disposed around the rotation shaft to form the track groove, an opening formed along the cylindrical circular guides, a cover plate attached to the cylindrical circular guides to cover the opening to form a sealed space as the track groove, and a disc clamp preventing an optical disc loaded on the turntable during rotating the turntable.

According to another aspect of the present invention, the moving members are a ball.

According to another aspect of the present invention, the collision and dispersion inducing unit includes a plurality of protrusions disposed on the track groove in an interval.

According to another aspect of the present invention, the balls has a diameter between 60% and 95% of the depth of the track groove.

According to another aspect of the present invention, the protrusions have the height so that the moving members do not contact the protrusions when the moving members is stationary.

According to another aspect of the present invention, the protrusions are formed on an inside surface of an upper portion of the turntable.

According to another aspect of the present invention, the protrusions are arranged in an interval of 120 degrees with respect to the rotation shaft.

To achieve the above and other objects, there is provided a spindle motor in an optical disc player according to an embodiment of the present invention. The spindle motor includes a plate including a burring unit having a hollow cylinder, a holder coupled to the hollow cylinder of the burring unit and having a bottom side, a core attached to an outside surface of the burring unit, and a bearing inserted into an inside of the burring unit, a rotor including a rotation shaft rotatably inserted into the bearing and rotataby supported by a bottom side of the holder, a cap coupled to the rotation shaft and having a circular extension around the rotation shaft, and a magnet attached to an inside of the circular extension of the cap to face the core and to be spaced-apart from the core by an air gap, and a turntable including a circular track groove formed around the rotation shaft, rotating together with the rotation shaft, and having a plurality of balls disposed in the track groove. The spindle motor also includes a protrusion disposed on the circular track groove, colliding with one of the balls bounding in the track groove in an initial period of rotating the turntable to generate a rebounding phenomenon between the balls, and controlling the balls to be spaced-apart form each other by a predetermined distance.

According to another aspect of the present invention, the turntable includes a main body including a surface and guides extended from the first surface to form the track guide and to have a groove opening, the main body fixedly coupled to the rotation shaft, and a plate cover coupled to the guides to cover the groove opening.

According to another aspect of the present invention, the turntable is disposed on a side wall of the circular extension of the rotor, and the main body forms an integrated monolithic body with the rotor.

According to another aspect of the present invention, the balls have a diameter between 60% and 95% of a depth of the track groove.

According to another aspect of the present invention, the protrusion has the height so that the moving members do not contact the protrusions when the moving members is stationary.

According to another aspect of the present invention, the protrusion is formed on a surface of the upper portion of the turntable opposite to another surface on which the balls are disposed.

According to another aspect of the present invention, the protrusion includes first and second protrusions disposed on the track groove in an interval.

BRIEF DESCRIPTION OF THE DRAWINGS

These and other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
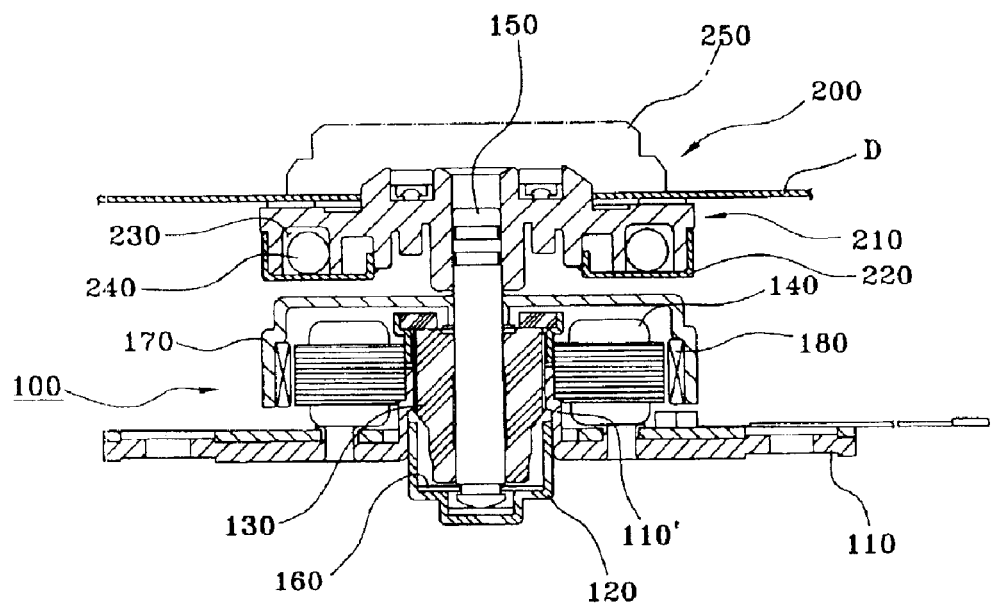
FIG. 1 is a cross-sectional view of a conventional spindle motor of an optical disc player.
Figure 2:
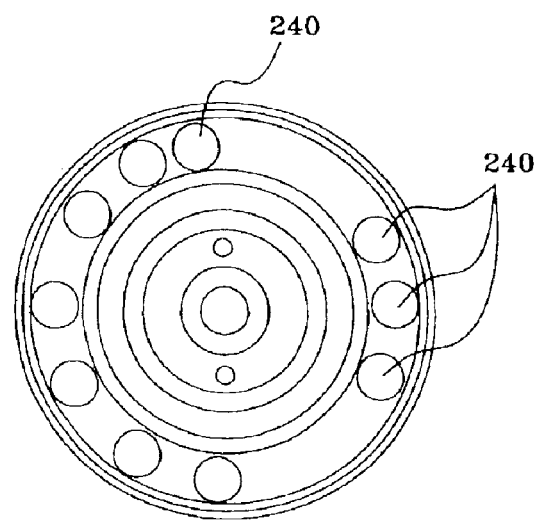
FIG. 2 is a plan view showing an arrangement of balls disposed in a turntable in an stationary state of the conventional spindle motor of FIG. 1.
Figure 3:
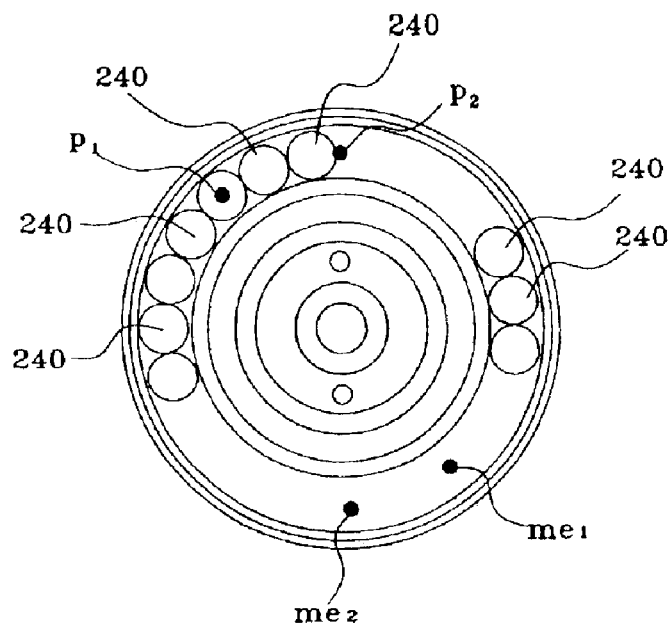
FIG. 3 is a plan view showing the arrangement of the balls disposed in the turntable in a rotational state of the conventional spindle motor of FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

Figure 4:
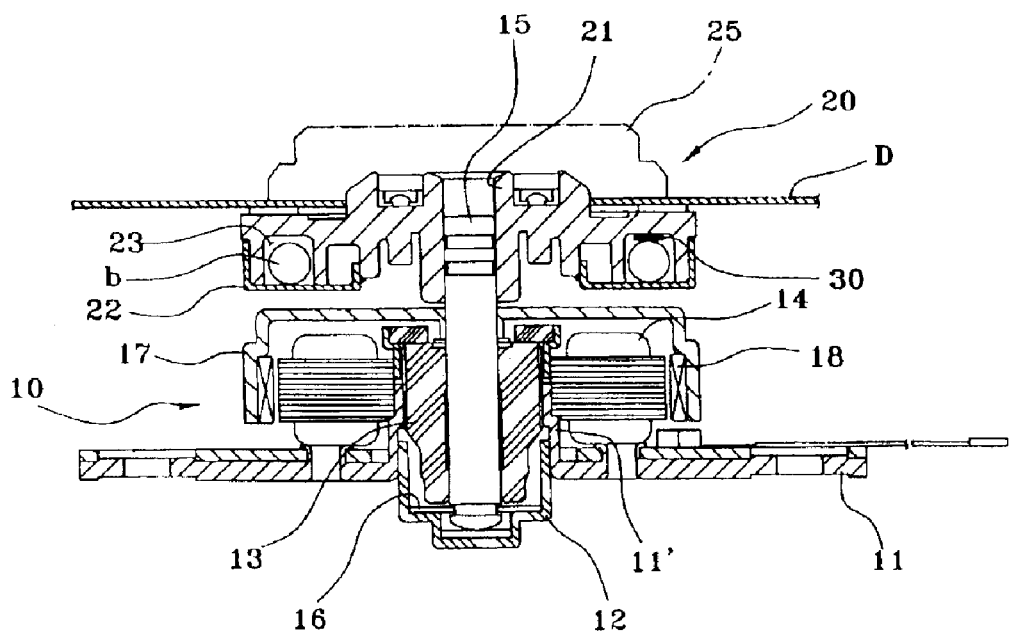
FIG. 4 is a cross-sectional view of a spindle motor of an optical disc player according to an embodiment of the present invention.

Hereinafter, embodiments of the present invention is explained in detail. FIG. 4 is a cross-sectional view of a spindle motor of an optical disc player according to an embodiment of the present invention, and FIG. 5 is a bottom view showing protrusions formed on a track groove of a turntable of the spindle motor shown in FIG. 4.

Figure 5:
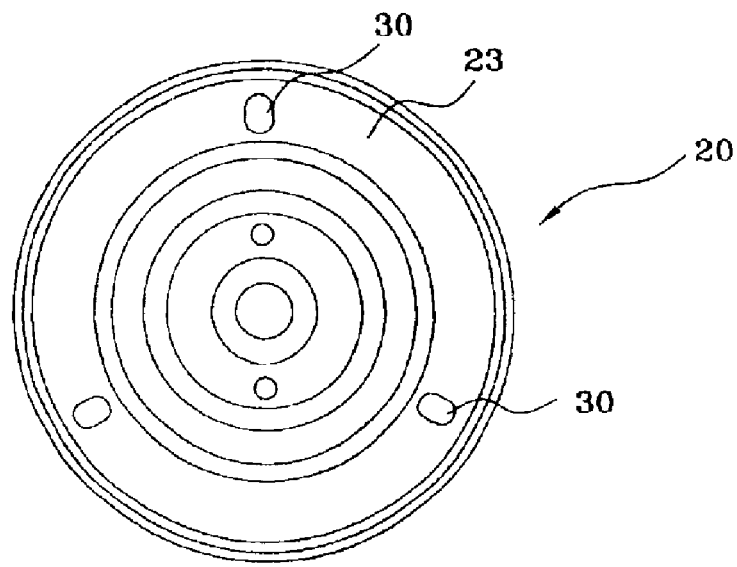
FIG. 5 is a bottom view showing protrusions formed on a track groove of a turntable of the spindle motor shown in FIG. 4.

Referring to FIGS. 4 and 5, the spindle motor of the optical disc player includes a motor 10 generating a rotation force and a turntable 20, on which an optical disc is loaded, rotating in an initial speed and in a normal (high) speed in response to the rotation force of the motor 10.

The motor 10 includes a plate 11, a burring unit 11' having a first cylindrical wall protruding upward from the plate 11 and an opening, and a holder 12 having a second cylindrical wall and fitted into a bottom of the first cylindrical wall of the burring unit 11' through the opening. A core 14 having a coil winding around the core 14, to which an external electric power is selectively transmitted, is fixedly attached to an outside circumferential surface of the burring unit 11'.

A metal bearing 13 is forcibly inserted in a space formed between the rotation shaft 15 and the burring unit 11' and the holder 12, and the rotation shaft 15 is rotatably disposed in a central hole of the bearing 13 and supported by the bearing 13 and the plate 11. A thrust washer 16 is coupled to a lower outside end of the rotation shaft 15. A rotor 17 is coupled to an upper end of the rotation shaft 15 to form an integrated single body. The rotor 17 includes a cap having a flat plate and an peripheral cylindrical extension extended downward from the flat plate, a circular magnet having N and S polarities alternatively attached to an inside surface of the peripheral cylindrical extension. The circular magnet faces the coil of the core 14 and is spaced-apart from the coil of the core 14 by an air gap formed between the circular magnet of the rotor 17 and the coil of the core 14.

The turntable 20 rotates together with the rotation shaft 15 of the motor 10 and includes a main body 21, a cover late 22, and a plurality of balls b as a self-compensating dynamic balancing apparatus.

The main body 21 includes a main plate, a through hole into which the rotation shaft 15 is forcibly inserted, formed on the main plate, a hollow cylinder extended downward from the main plate to form an opened bottom portion. A track groove 23 is formed on a peripheral circular portion of the main plate around the rotation shaft 15. A movable unit includes a plurality of moving members compensating for eccentricity of the turntable 20 during moving along the track groove 23.

The movable unit can be one of various types and shapes, and the balls b made of a rigid body and having a spherical shape are used as the moving members. The balls b generate a counter-centrifugal force by moving along the track groove 23 to a compensating position opposite to an eccentric force of the turntable 20 when the turntable 20 rotates. The balls has a diameter of 60–95% of a depth of the track groove 23. A disc clamp 25 is disposed on an upper side of the main body 21 of the turntable 20 to clamp the optical disc D when the optical disc D is loaded on the turntable 20.

The cover plate 22 is disposed on an opening of the track groove 23 to be forcibly coupled to two guides of the track groove 23, thereby sealing the track groove 23. The two guides of the track groove 23 are extended from the main plate of the main body 21 downward to form the opening. The balls b are disposed between two guides and between a first surface, e.g., the main plate of the main body 21, and a second surface, e.g., the cover plate 22. The first and second surfaces are spaced apart from each other by a height greater than a diameter of the balls b.

A collision and dispersion inducing unit is provided in the turntable 20 to cause the balls to scatter or disperse uniformly or regularly from an initial position to a scatter position, e.g., the compensating position, to compensating for the eccentricity of the turntable 22 within an initial rotating state (period) before the motor 10 rotates in the normal (high) speed. When the balls 24 disposed in the track groove 23 moves by an unbalanced displacement generated due to the centrifugal force and the friction, a rebounding phenomenon is generated between the balls rebounded by a collision with the collision and dispersion inducing unit, and then the balls b are uniformly and regularly arranged, spaced-apart from each other or equally disperse or are scattered around the track groove.

The collision and dispersion inducing unit can have one of various shapes protruding from an inside upper surface of the tracking groove 23 (main plate of the main body 21) toward the cover plate 22 by a second height. The first height of the track groove is greater than a sum of the second height of the collision and dispersion inducing unit and the diameter of the one of the balls b.

For example, the collision and dispersion inducing unit may have a plurality of protrusions 30 made by an injection molding and formed on the inside upper surface of the track groove 23 in a monolithic body with the track groove 23. The number of the protrusions 30 is between 2 and 10 in accordance with the number of the balls or a size of the turntable 20.

Figure 6:
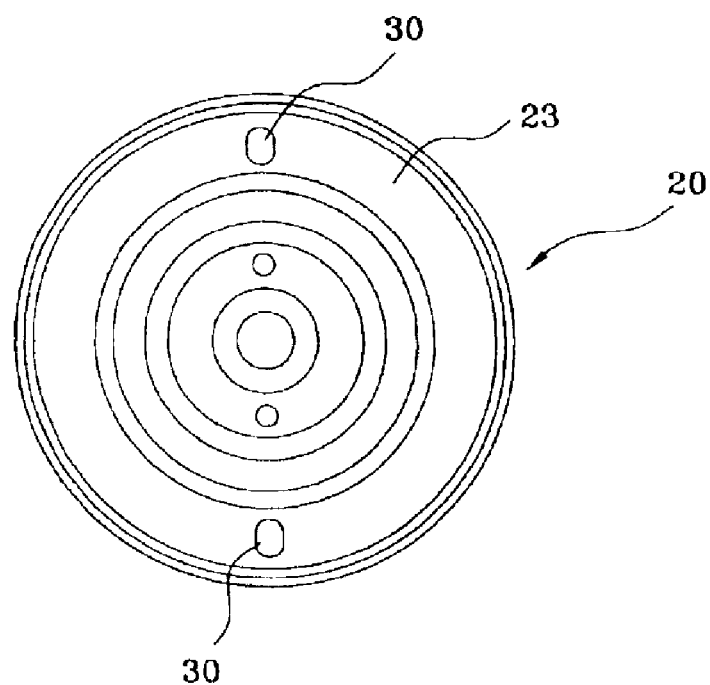
FIG. 6 is a bottom view showing another protrusions formed on the track groove of the turntable of the spindle motor shown in FIG. 4.

The protrusions 30 are disposed on the inside upper surface of the track groove 23 in a predetermined interval and may be disposed at three positions on the inside upper surface of the track groove 23 in the interval of 120° with respect to the rotation shaft 15 as shown in FIG. 5. The protrusions 30 are disposed at two positions on the inside upper surface of the track groove 23 in the interval of 180° with respect to the rotation shaft 15 as shown in FIG. 6.

The protrusions 30 protrude not to contact the balls b when the balls b does not move but are stationary (in a stationary state), and is formed to have a width of 20–150% of the diameter of the balls b. The protrusions 30 may have a polygonal shape to hit or collide with a portion of one of the balls b easily when the balls b moves and bounds from the cover plate 22 while irregularly vibrating in a radial direction or an axial direction of the rotation shaft 15 by the rebounding phenomenon of the balls b in an initial movement of the turntable 20 during the initial rotation period.

When the turntable 20 rotates together with the rotation shaft 15, the balls b move in the same direction of the turntable 20 in a lower speed than the initial speed of the turntable 20 by other vibration and the friction between the balls b and bound in the axial direction.

That is, the balls b move along the track groove 23 in the same direction of the turntable 20 as well as in the axial direction while irregularly bounding within the track groove 23, and move in the lower speed than the initial speed of the turntable 20. The protrusions 30 hit or collide with the portion of the one of the balls b moving in the lower speed than the protrusions 30 of the turntable 20, and the hit ball hits or collides with another preceding ball which moves in the lower speed than the protrusions 30 of the track groove 23 of the turntable 20 and disposed in front of the hit ball in a rotation (circular) direction of the turntable 20 and the rotation shaft 15. Since the hit ball hits the preceding ball in the tracking groove 23, the rebounding phenomenon between the hit ball and the preceding ball b is induced, and the balls b are disposed and arranged to be spaced apart by an equal distance in the rotation direction.

Figure 11:
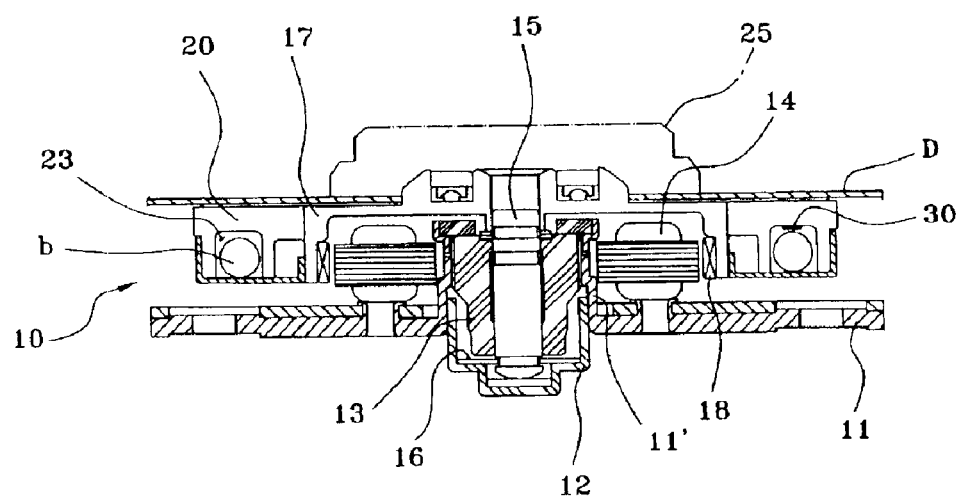
FIG. 11 is a cross-sectional view of a spindle motor of an optical disc player according to another embodiment of the present invention.

FIG. 11 is a cross-sectional view of the spindle motor of the optical disc player according to another embodiment of the present invention. The turntable 20 is disposed on the rotor 17, and the tracking groove 23 is disposed on the peripheral cylindrical extension of the rotor 17 to form an integrated single body, e.g., the turntable 20, with the rotor 17. The tracking groove 23 and the rotor 17 are disposed on the same plane perpendicular to the rotation shaft 15.

The motor 10 includes the plate 11, the burring unit 11' having the first cylindrical wall protruding upward from the plate 11, and the holder 12 having the second cylindrical wall with the opening and fitted into the bottom of the first cylindrical wall of the burring unit 11'. The core 14 having the coil winding around the core 14, to which the external electric power is selectively transmitted, is fixedly attached to the outside circumferential surface of the burring unit 11'.

The metal bearing 13 is forcibly inserted in the space formed between the rotation shaft 15 and the burring unit 11' and the holder 12, and the rotation shaft 15 is rotatably disposed in the central hole of the bearing 13 and supported by the bearing 13 and the plate 11. The thrust washer 16 is coupled to the lower outside end of the rotation shaft 15. The rotor 17 is coupled to the upper end of the rotation shaft 15 to form the integrated single body. The rotor 17 includes the cap shape having the peripheral cylindrical extension extended downward, the circular magnet having N and S polarities alternatively Attached to the inside surface of the peripheral cylindrical extension. The circular magnet faces the coil of the core 14 to be spaced-apart from the coil of the core 14 by the air gap formed between the circular magnet of the rotor 17 and the coil of the core 14.

As shown in FIG. 11, the motor 10 includes the turntable 20 disposed on the rotor 17 to form an integrated body or an assembled body with the rotor 17. The turntable 20 includes the track groove 23 disposed around the rotor 17 in the circular shape.

The rotor 17 forms the integrated body with the turntable 20 as shown in FIG. 5, and the plurality of the rolling members are disposed to rotate freely in the track groove 23 when the turntable 20 rotates, to compensate for the eccentricity of the turntable 20. The rolling members is made of a rigid body having a spherical shape, e.g., the balls b.

The collision and dispersion inducing unit is provided in the turntable 20 to uniformly or regularly scatter or disperse the balls b from the initial position to the scatter position, e.g., the compensating position, to compensating for the eccentricity of the turntable 22 within the initial rotation period before the motor 10 rotates in the normal (high) speed. When the balls b disposed in the track groove 23 moves by an unbalanced displacement generated due to the centrifugal force and the friction, the rebounding phenomenon is generated between the balls b rebounding by the collision with the collision and dispersion inducing unit to arrange the balls b to be uniformly and regularly spaced-apart from each other or to be equally scattered around the track groove.

The collision and dispersion inducing unit can have one of various shapes protruding from the inside upper surface of the tracking groove 23 to the first height from the inside upper surface of the tracking groove 23.

For example, the collision and dispersion inducing unit may have the plurality of protrusions 30 made by an injection molding and formed on the inside upper surface of the track groove 23 in a monolithic body with the track groove 23. The number of the protrusions 30 is between 2 and 10 in accordance with the number of the balls or a size of the turntable 20.

The protrusions 30 protrude not to contact the balls b when the balls b does not move but are in the stationary state, and is formed to have the width of 20–150% of the diameter of the balls b. The protrusions 30 may have the polygonal shape to hit the portion of one of the balls b easily when the one of the balls b moves and bounds while irregularly vibrating in the radial direction or the axial direction of the rotation shaft 15 by the rebounding phenomenon of the balls b in the initial movement of the turntable 20.

When the turntable 20 rotates together with the rotation shaft 15, the balls b move in the same direction as the turntable 20 in the lower speed than the rotation speed of the turntable 20 by the friction between the balls b and other vibration and bound in the axial direction.

That is, the balls b move along the track groove 23 in the same direction of the turntable 20 as well as in the axial direction while irregularly bounding within the track groove 23, and move in the lower speed than the rotation speed of the turntable 20. The protrusions 30 hit the portion of the one of the balls b moving in the lower speed than the protrusions 30 of the turntable 20, and the hit ball b hits another preceding ball b which moves in the lower speed than the protrusions 30 of the track groove 23 of the turntable 20 and is disposed in front of the hit ball in the rotation (circular) direction of the turntable 20 or the rotation shaft 15. Since the hit ball b hits the preceding ball b in the tracking groove 23, the rebounding phenomenon between the hit ball and the preceding ball b is induced, and the balls b are disposed and arranged to be spaced apart by an equal distance in the rotation direction.

A method of compensating for the eccentricity of the turntable having the moving members and the collision and dispersion inducing unit as a self-compensating dynamic balancer in the spindle motor of the optical disc player according to another embodiment of the present invention will be explained in detail as follows.

The turntable 20 rotates together with the rotation shaft 15 in the initial speed and the normal (high) speed when the optical disc D is loaded on the turntable 20 and clamped by the disc clamp 25. Since the optical disc D has an eccentric mass when rotating in the initial speed, the balls b rotatably disposed in the track groove 23 moves along the track groove 23 to the compensating position opposite to the eccentric force position of the eccentric force to generate the counter-eccentric force, thereby compensating for the eccentricity occurring due to the eccentric force of the turntable 20.

The balls b obtain a kinetic energy in response to the rotation of the turntable 20 moving from the stationary state to a rotation state. A bounding phenomenon in the axial direction occurs in the balls b by friction. The balls b vibrate in the axial direction by the friction between the adjacent balls b when moving along the track groove 23 from the stationary state to the rotating state during the initial rotation period. Some of the balls b collide with the protrusions 30 of the collision and dispersion inducing unit, and the rebounding phenomenon occurs the adjacent colliding balls b or between the protrusions 30 of the collision and dispersion inducing unit and the one of the balls.

Figure 7:
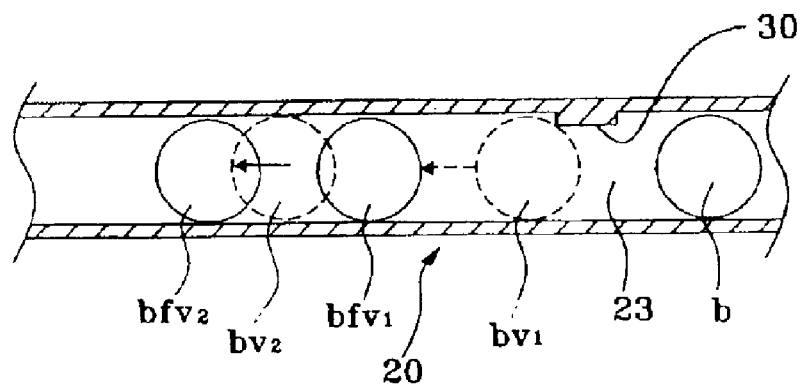
FIGS. 7 and 8 are schematic diagrams showing an arrangement of balls disposed on the track groove of the turntable in an initial rotating state of the spindle motor shown in FIG. 4.
Figure 8:
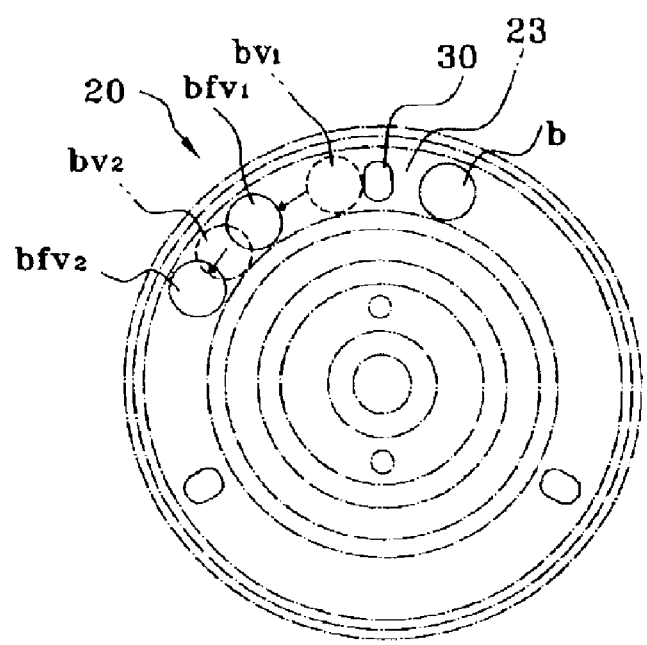

FIGS. 7 and 8 are schematic diagrams showing an arrangement of the balls b disposed on the track groove 23 of the turntable 20 in the initial rotation state of the spindle motor shown in FIG. 4.

As examples, balls bv1, bv2 shown by dotted lines are the balls b before the rebounding phenomenon, e.g., before the balls bv1, bv2 collide, and balls bfv1, bfv2 shown by solid lines are the balls b after the rebounding phenomenon, e.g., after the balls bfv1, bfv2 or the protrusions 30 of the collision and dispersion inducing unit and the one of the balls b, collides.

Since the turntable 20 is directly connected to the rotation shaft 15 of the motor 10, the turntable 20 rotates in the same rotation speed as the rotation shaft 15 of the motor 10. To the contrary, since the balls b is accelerated by the friction between the track groove 23 of the turntable 20 and the balls b or the centrifugal force, the rotation speed of the turntable 20 is greater than that of the balls b in the initial rotation period.

In this state, the balls b shows the bounding phenomenon that the balls rotate or move while vibrating and bounding in upper and lower directions of the turntable 20. Thus, some of the balls b collide with the protrusion 30 of the collision and dispersion inducing unit.

Accordingly, since the turntable 20 moves faster than balls b, the ball bv1 colliding with the protrusion 30, which rotates the same rotation speed as the turntable 20 because the protrusion 30 is formed in a single body with the turntable 20, rebounds to advance to a first position corresponding to the ball bfv1 in response to an elastic collision force, and the rebounding ball, e.g., the ball bfv1, collides with the preceding ball bv2 to move the ball bv2 to a position corresponding to the ball bfv2 in response to the elastic collision force. Since the balls b are made of the rigid body, the elastic collision force is generated when two adjacent balls collide.

The protrusions 30 of the collision and dispersion inducing unit formed on the track groove 23 of the turntable 20 induce an artificial working force, e.g., the elastic collision force, to the balls b, and thus the balls b uniformly disperse and are disposed to be spaced-apart from each other in the predetermined interval.

Figure 9:
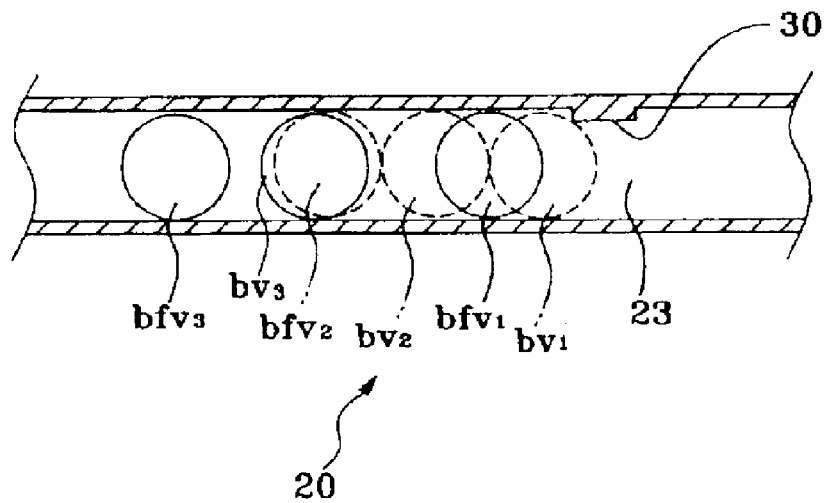
FIGS. 9 and 10 are schematic diagrams showing another arrangement of the balls disposed on the track groove of the turntable in the initial rotating state of the spindle motor shown in FIG. 4.
Figure 10:
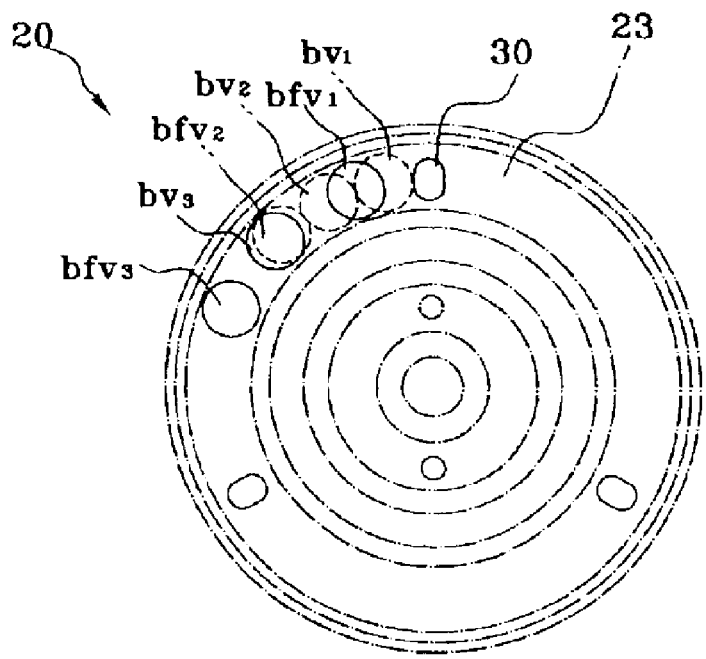

FIGS. 9 and 10 are schematic diagrams showing another arrangement of the balls b which is different from the arrangement of the balls b shown in FIGS. 7 and 8. Balls bv1, bv2, bv3 before the rebinding phenomenon, e.g., before the balls b collide with protrusions 30 of the collision and dispersion inducing unit are shown by dotted lines. Balls bfv1, bfv2, bfv3 after the rebounding phenomenon, e.g., after the balls b or the protrusions 30 of the collision and dispersion inducing unit and the one of the balls b collide, are shown by solid lines.

The balls bv1, bv2, bv3 are in contact with one another in the stationary state of the turntable 20 and the motor 10 and move along the track groove 23 as a group of balls while contacting one another as shown by the dotted lines in FIG. 9. When one of the balls bv1, bv2, bv3 collides with one of the protrusions 30 of the collision and dispersion inducing unit formed on the inside surface of the turntable 20, the balls bv1, bv2, bv3 disperse to move to different positions corresponding to respective ones of the balls bfv1, bfv2, bfv3 shown by the solid lines of FIG. 9.

That is, since the turntable 20 moves faster than balls b, the ball bv1 colliding with the protrusion 30, which rotates the same speed as the turntable 20 because the protrusion 30 is formed in a single body with the turntable 20, rebounds to advance to the different position corresponding to the ball bfv1 in response to the elastic collision force, and then the rebounding ball, e.g., the ball bfv1, collides with the preceding ball bv2 to move the ball bv2 to different position corresponding to the ball bfv2 in response to the elastic collision force. Subsequently, the ball bfv2 collides with the precedent ball bv3 to move the ball bv3 to different position corresponding to the ball bfv3 in response to the elastic collision force. Accordingly, the ball bv1 moves to the position corresponding to the ball bfv1, the ball bv2 moves to the position corresponding to the ball bfv2, and the ball bv3 moves to the position corresponding to the ball bfv3. Thus, the balls bv1, bv2, bv3 disperse to be spaced-apart from each other by the predetermined interval.

When the balls bv1, bv2, bv3, which disperse and are spaced-apart from each other by the predetermined interval, are accelerated, the rebounding phenomenon caused by the collision is no longer happened, and the balls bfv1, bfv2, bfv3 move along the track groove 23 without colliding and rebounding.

The dispersing balls bfv1, bfv2, bfv3 move to the compensating position in a very short period of time to generate the counter-eccentric force to compensate for the eccentric force of the turntable 20 during the initial rotation period of the motor 10 before the motor 10 rotate the turntable 20 in the normal (high) speed.

As described above, the spindle motor of the optical disc player according to the present invention is advantages in that the balls disposed in the track groove move to the compensating position in a very short period of time by the collision with the protrusions of the collision and dispersion inducing unit to generate the counter-eccentric force, thereby compensating for the eccentric force during the initial rotation period of the motor and stabilizing the turntable during rotating the turntable in the high speed.

Accordingly, an unbalance correcting characteristic of the optical disc loaded on the turntable is improved, stability of the optical disc is improved, vibration and noise of the turntable and the motor are reduced, and a failure of compensating for the eccentric force is prevented. As a result, liability, quality, and durability of the optical disc player are improved.

Although a few preferred embodiments of the present invention have been shown and described, it would be appreciated by those skilled in the art that changes may be made in this embodiment without departing from the principle and spirit of the invention, the scope of which is defined in the claims and their equivalent.

What is claimed:

1. A spindle motor in an optical disc player, comprising:
    a motor having a rotation shaft;
    a turntable rotating together with the rotation shaft and having a track groove having a circular shape formed around the rotation shaft;
    moving members disposed in the track groove to move along the track groove to compensate for an eccentric force;
    a collision and dispersion inducing unit having a height from the track groove to induce a rebounding phenomenon between the moving members to be spaced-apart from each other when the moving members are arranged in a non-uniform displacement due to a centrifugal force and a friction between the track groove and the moving members;
    wherein the collision and dispersion inducing unit comprises:
    a plurality of protrusions disposed on the track groove in an interval, and the protrusions have a height so that the moving members do not contact the protrusions when the moving members is stationary.

2. The spindle motor of claim 1, wherein the motor comprises:
    a burring unit including a cylinder with a lower opening;
    a plate including a holder having a second cylinder with an upper opening and inserted into the burring unit through the opening of the burring unit, having a hole into which the rotation shaft is forcibly inserted;
    a bearing disposed between the rotation shaft and the cylinder of the burring unit;
    a core disposed around an outer surface of the burring unit and including a coil attached on the outer surface of the burring unit; and
    a rotor disposed on a bottom surface of the turntable and formed in an integrated body with the rotation shaft, including a cap having a peripheral circular extension extended downward, including a magnet disposed on a surface of the peripheral circular extension to face the coil of the core and to be spaced apart from the coil of the core by an air gap.

3. The spindle motor of claim 1, wherein the turntable comprises:
    a main body;
    a cylindrical circular guides extended from the main body and disposed around the rotation shaft to form the track groove;
    an opening formed along the cylindrical circular guides; and
    a cover plate attached to the cylindrical circular guides to cover the opening to form a sealed space as the track groove.

4. The spindle motor of claim 1, wherein the spindle motor comprises a rotor disposed around the rotation shaft and rotating together with the rotation shaft, and the turntable is disposed on a sidewall of the rotor to form an integrated body with the rotor.

5. The spindle motor of claim 1, wherein the moving members are balls.

6. The spindle motor of claim 5, wherein the track groove has a depth, and the balls have a diameter between 60% and 95% of the depth of the track groove.

7. The spindle motor of claim 1, wherein the protrusions are formed on an inside surface of an upper portion of the turntable.

8. The spindle motor of claim 1, wherein the protrusions are arranged in an interval of 120 degrees with respect to the rotation shaft.

9. A spindle motor in an optical disc player, comprising:
    a plate including a burring unit having a hollow cylinder, a holder coupled to the hollow cylinder of the burring unit and having a bottom side, a core attached to an outside surface of the burring unit, a bearing inserted into an inside of the burring unit;
    a rotor including a rotation shaft rotatably inserted into the bearing and rotatably supported by a bottom side of the holder, a cap coupled to the rotation shaft and having a circular extension around the rotation shaft, and a magnet attached to an inside of the circular extension of the cap to face the core and to be spaced-apart from the core by an air gap;
    a turntable including a track groove formed around the rotation shaft, rotating together with the rotation shaft, and having a plurality of balls disposed in the track groove; and
    a protrusion disposed on the circular track groove, colliding with one of the balls bounding in the track groove in an initial period of rotating the turntable to generate a rebounding phenomenon between the balls, and controlling the balls to be spaced-apart from each other by a predetermined distance, wherein the protrusion has a height so that the moving members do not contact the protrusions when the moving members is stationary.

10. The spindle motor of claim 9, wherein the turntable comprises:
    a main body including a surface and guides extended from the first surface to form the track guide and to have an opening, the main body fixedly coupled to the rotation shaft; and
    a plate cover coupled to the guides to cover the opening.

11. The spindle motor of claim 9, wherein the turntable is disposed on a side wall of the circular extension of the rotor, and the main body forms an integrated monolithic body with the rotor.

12. The spindle motor of claim 9, wherein the track groove has a depth, and the balls have a diameter between 60% and 95% of the depth of the track groove.

13. A spindle motor in an optical disc player, comprising:

a plate including a burring unit having a hollow cylinder, a holder coupled to the hollow cylinder of the burring unit and having a bottom side, a core attached to an outside surface of the burring unit, a bearing inserted into an inside of the burring unit;

a rotor including a rotation shaft rotatably inserted into the bearing and rotatably supported by a bottom side of the holder, a cap coupled to the rotation shaft and having a circular extension around the rotation shaft, and a magnet attached to an inside of the circular extension of the cap to face the core and to be spaced-apart from the core by an air gap;

a turntable including a track groove formed around the rotation shaft, rotating together with the rotation shaft, and having a plurality of balls disposed in the track groove; and a protrusion disposed on the circular track groove, colliding with one of the balls bounding in the track groove in an initial period of rotating the turntable to generate a rebounding phenomenon between the balls, and controlling the balls to be spaced-apart from each other by a predetermined distance, wherein the protrusion is formed on a surface of the upper portion of the turntable opposite to another surface on which the balls are disposed.

14. A spindle motor in an optical disc player comprising:

a motor having a rotation shaft;

a turntable rotating together with the rotation shaft, and having a track groove formed around the rotation shaft and having first and second surfaces spaced-apart from each other by a first height;

moving members disposed on the first surface in the track groove, having a diameter, and moving along the track groove to compensate for an eccentric force of the turntable;

a collision and dispersion inducing unit formed on the second surface of the turntable, being spaced-apart from the moving members when the moving members are stationary, colliding with one of the moving members bounding from the first surface toward the second surface when the moving members rotate along the track groove in response to a rotation of the turntable during an initial rotating period, inducing a rebounding phenomenon between the moving members when the moving member moves by a centrifugal force and a friction between the track groove and the moving members, wherein the first height of the track groove is greater than a sum of the second height of the collision and dispersion inducing unit and the diameter of the one of the moving members.

15. The spindle motor of claim 14, wherein the collision and dispersion inducing unit has a width of 20–150% of a diameter of the one of the moving member.

16. The spindle motor of claim 14, wherein the collision and dispersion inducing unit comprises:

one of a polygon and a rounded shape.

17. A spindle motor in an optical disc player comprising:

a motor having a rotation shaft;

a turntable rotating together with the rotation shaft, and having a track groove formed around the rotation shaft and having first and second surfaces spaced-apart from each other by a first height;

moving members disposed on the first surface in the track groove, having a diameter, and moving along the track groove to compensate for an eccentric force of the turntable;

a collision and dispersion inducing unit formed on the second surface of the turntable, being spaced-apart from the moving members when the moving members are stationary, colliding with one of the moving members bounding from the first surface toward the second surface when the moving members rotate alone the track groove in response to a rotation of the turntable during an initial rotating period, inducing a rebounding phenomenon between the moving members when the moving member moves by a centrifugal force and a friction between the track groove and the moving members, wherein the one of the moving member bounds from the first surface toward the second surface by a third height, and the first height of the track groove is less than a sum of the second height of the collision and dispersion inducing unit, the diameter of the one of the moving members, and the third height of the bounding moving member.

* * * * *